Figure 3B:
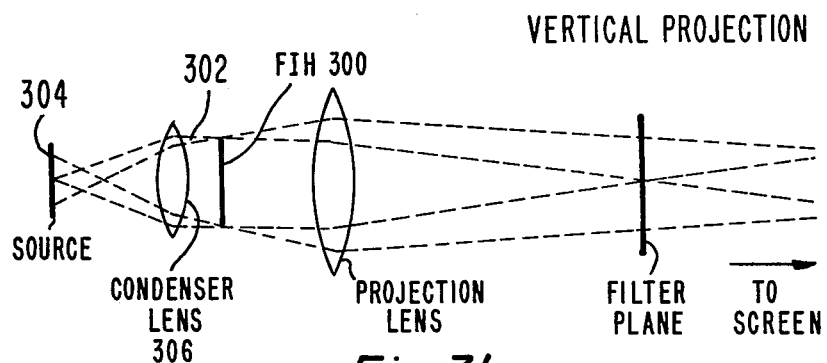

United States Patent [19]
Gale

[11] 4,213,673
[45] Jul. 22, 1980

[54] PROJECTOR FOR READING OUT COLOR-ENCODED FOCUSED IMAGE HOLOGRAMS EMPLOYING AN OPTIMUM ENCODING SCHEME

[75] Inventor: Michael T. Gale, Wettswil, Switzerland

[73] Assignee: RCA Corporation, New York, N.Y.

[21] Appl. No.: 903,687

[22] Filed: May 8, 1978

[51] Int. Cl.² .................. G02B 27/18; G02B 27/38; G03H 1/24; G03H 1/28
[52] U.S. Cl. .................. 350/162 SF; 350/3.77; 350/3.84
[58] Field of Search .................. 350/3.77, 3.75, 3.84, 350/3.86, 162.SF

[56] References Cited

U.S. PATENT DOCUMENTS

| 3,470,310 | 9/1969 | Shashova | 350/162 SF |
| 3,572,900 | 3/1971 | Bouche | 350/162 SF |
| 3,586,434 | 6/1971 | Mueller | 350/162 SF |
| 3,641,895 | 2/1972 | Bestenreiner et al. | 350/162 SF |
| 3,702,725 | 11/1972 | Macovski | 350/162 SF |
| 3,917,378 | 11/1975 | Gale | 350/162 SF |
| 3,924,925 | 12/1975 | Gale | 350/162 SF |

Primary Examiner—Ronald J. Stern
Attorney, Agent, or Firm—Samuel Cohen; George J. Seligsohn

[57] ABSTRACT

An encoding scheme, in readout, generates a spatially separated entire spectrum for each one of the three primary colors. This permits spatially separated color filters to select each primary color from its own spectrum.

11 Claims, 12 Drawing Figures

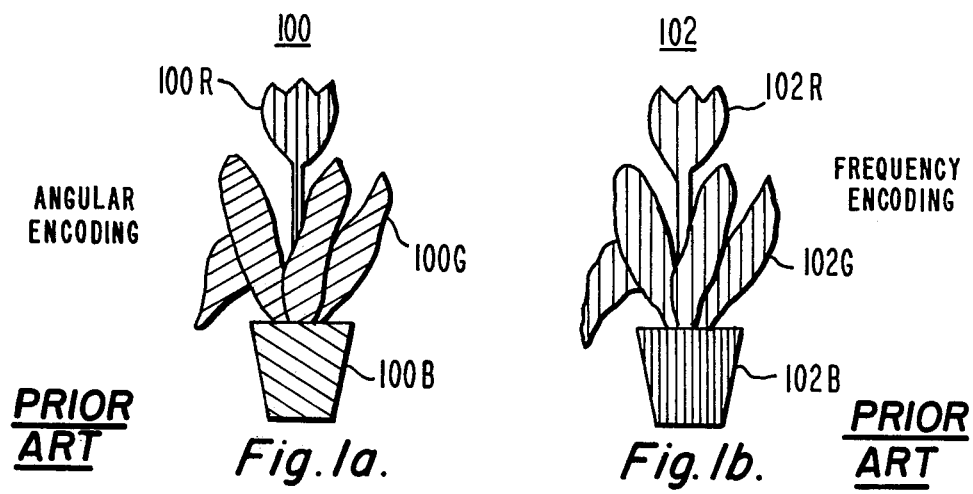
Fig. 1a. ANGULAR ENCODING PRIOR ART
Fig. 1b. FREQUENCY ENCODING PRIOR ART
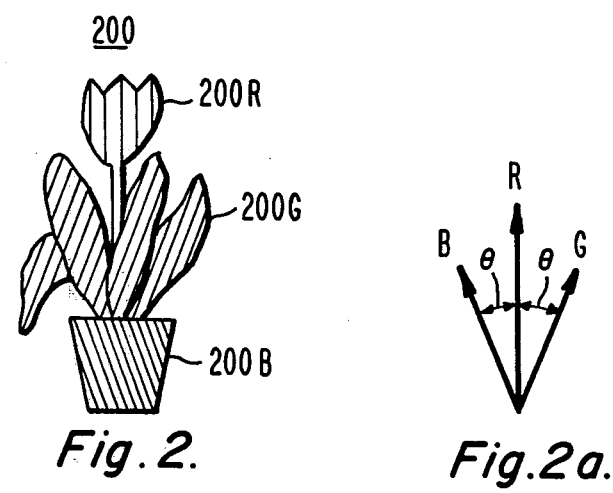
Fig. 2.
Fig. 2a.
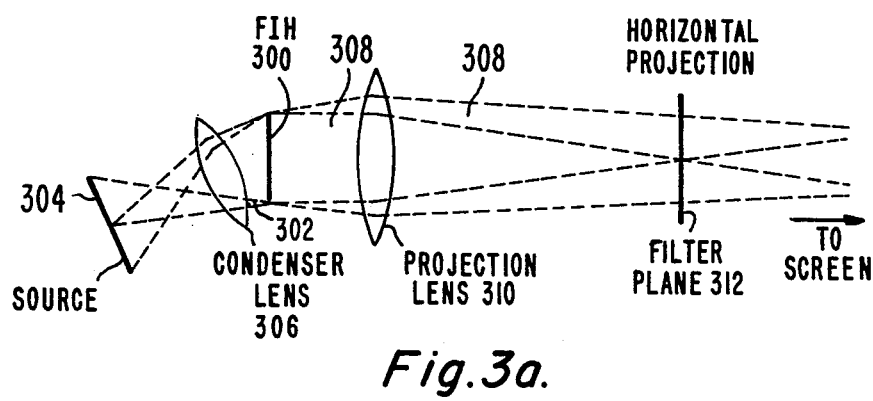
Fig. 3a.

PROJECTOR FOR READING OUT COLOR-ENCODED FOCUSED IMAGE HOLOGRAMS EMPLOYING AN OPTIMUM ENCODING SCHEME

This invention relates to an optimum encoding scheme for color-encoded focused image holograms and, more particularly, to a projector for reading out such color-encoded focused image holograms.

Many color processes based upon the diffraction of white light from three modulated periodic carriers already exist. These processes differ basically in the details of color encoding and in the manner of recording. Originally, encoded images were recorded by contact printing or imaging color separations through three diffraction gratings to provide carrier-frequency photographs. More recently, high-resolution carrier-frequencies in excess of about 500 lines/mm have been obtained by employing holographic recording techniques. Such holographic recording means may be termed color-encoded focused image holograms.

Color encoding schemes differ in the choice of carrier frequencies and orientation. Two general techniques, which may be distinguished, are "angular-encoding" and "frequency encoding". Angular-encoding uses three carriers with the same spatial frequency, but different angular orientations. Projectors for angular-encoded focused imaged holograms utilize a plurality of color filters for deriving light of each of the three additive primary colors, red, green and blue. In one example of an angular-encoded focused image hologram projector, disclosed in U.S. Pat. No. 3,695,744 (Clay), the hologram is simultaneously illuminated by three angularly-separated, off-axis illuminating beams, which are respectively red, green and blue in color. A disadvantage of this scheme is that it requires a separate lamp, condenser lens and color filter to derive each of the three different primary colors illuminating beams.

In another example of a projector for angularly-encoded focused image holograms, which is disclosed in U.S. Pat. No. 3,702,725 (Macovski), a single on-axis, white-light illuminating beam is employed, but off-axis, angularly-separated first diffraction-order projected light beams derived from the respective carriers are passed through separate filters. In this case, the projection lens required must collect all first-order diffractive beams (i.e., grating carrier frequencies which are between two and three times finer than the finest picture resolution element must be resolved). This adds considerably to the cost of the projection lens and severely limits the maximum carrier frequencies, which may be used, which, in turn, limits the useable hologram resolution.

Frequency-encoding does not require color filters to derive the primary additive colors. Instead, the first-order diffraction light derived from each of the respective carriers is dispersed into its own entire separate visible spectrum. The respective spatial frequencies of the carriers are related to the respective wavelengths of the primary colors encoded thereby, such that the red portion of the red-encoded spectrum, the green portion of the green-encoded spectrum, and the blue portion of the blue-encoded spectrum are in coincidence. A spatial filter is employed for removing the unwanted remaining portions of all the three spectrums. When all three carriers of a frequency-encoded focused imaged holograms are oriented parallel to each other, resolvable beat frequencies may occur. U.S. Pat. No. 3,917,378 (Gale) discloses a modified frequency-encoded focused image hologram in which the occurrence of resolvable beat frequencies is avoided. This is accomplished by rotating one or more of the carriers, while increasing the carrier frequency to maintain a constant component in the former parallel direction.

A problem with these frequency encoding schemes is that the width of the light source and the spatial filter must be quite narrow in order to obtain good colorimetry. In the projector disclosed in the aforesaid U.S. Pat. No. 3,917,378, which employs a longitudinal slit as a spatial filter, the required narrow light source is a quartz-halogen lamp with non-standard filament dimensions of 1×20 mm. For good colorimetry it is also required that the filament be accurately positioned with respect to the projector optics and the longitudinal slit. The replacement of the lamp often necessitates a readjustment of the lamp holder, because good colorimetry requires a constant read-out angle of the holograms and that the illumination be plane parallel in the diffraction plane. This latter requirement also necessitates a projection lens with a larger aperture then would be otherwise needed if convergent read-out illumination could be used.

An optimum encoding scheme, taught by the present invention, for color coding a focused imaged hologram permits such focused image holograms to be read-out by a simpler and more practical projector than that required to read-out either the aforesaid angular-encoded or frequency-encoded image holograms. Briefly, in accordance with the present invention, a focused image hologram is comprised of a plurality of plane-parallel diffraction gratings, each of which has a different specified angular orientation and each of which has a different specified constant spatial frequency and is modulated in accordance with a different color component of a color picture to form a spatial carrier for that color component. The projector derives first diffraction-order output light from each respective one of the gratings that is individually dispersed into a separate spectrum of light and that has an individual spatial location determined by the specified angular orientation and specified spatial frequency of that one grating. The projector includes a plurality of spatially separated color filters having predetermined spatial locations, at least one of the color filters corresponding in color to each one of different components. Further, the specified angular orientations and spatial frequencies of gratings are such that the spatial location of the wavelength spectral portion corresponding to any and every certain one of the color components of each of the separate spectra of light intersects the spatial location of a color filter corresponding in color to the certain one of the color components solely for the spectrum of light which is derived from that one of the gratings which is modulated in accordance with the certain one of the color components.

Figure 4:
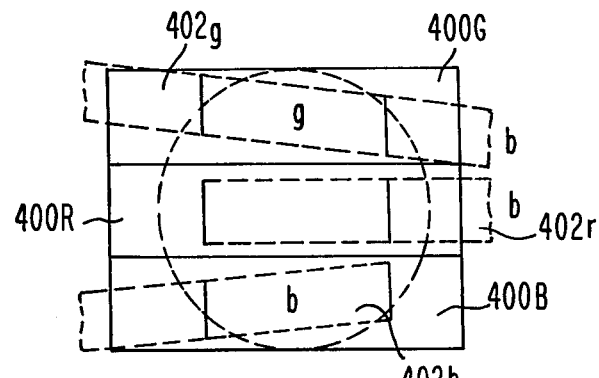
Figure 5:
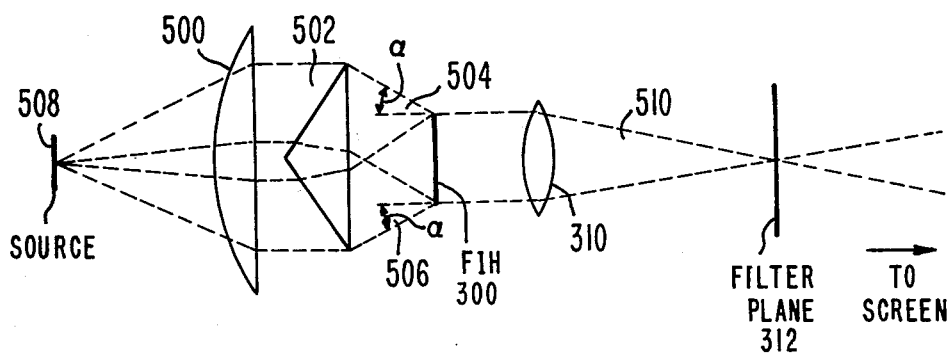
Figure 6A:
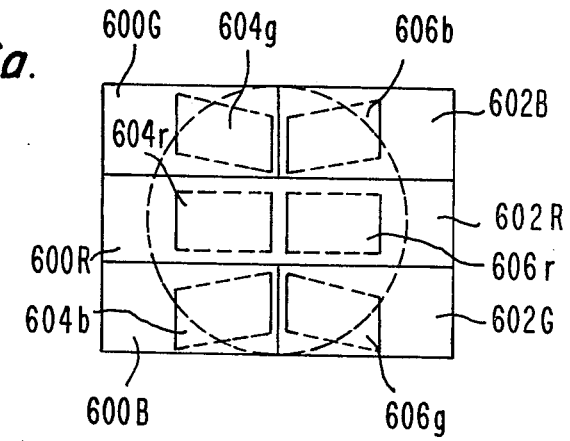
Figure 6B:
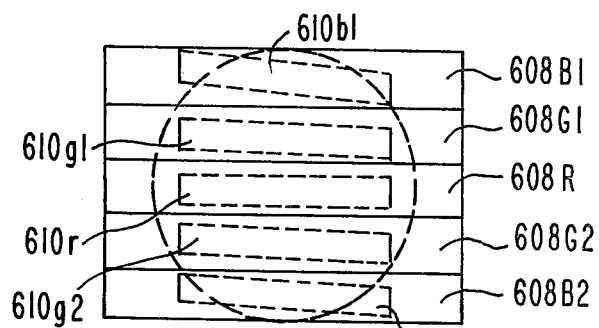
Figure 7:
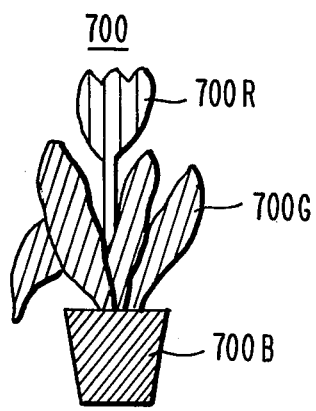
Figure 7A:
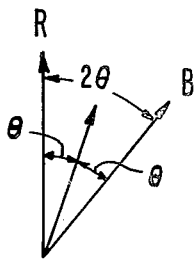

In the drawings:

FIGS. 1a and 1b, respectively, illustrate examples of angular encoding and frequency encoding employed by the prior art to color-encode focused image holograms;

FIGS. 2 and 2a illustrate an example of the optimum encoding of the focused image hologram employed by the present invention;

FIGS. 3a and 3b, respectively, are schematic horizontal and vertical views of a projector for projecting a color picture of focused image hologram color-encoded in accordance with the principles of the present invention;

FIG. 4 is an end view of the filter plane of the projector shown in FIGS. 3a and 3b;

FIG. 5 schematically illustrates a horizontal view of another projector employing the principles of the present invention, which utilizes two separate holograms illuminating light beams;

FIGS. 6a and 6b, respectively, are two alternative groups of filters which may be situated in the focus plane of FIG. 5;

FIGS. 7 and 7a illustrate an alternative example of color-encoding a focused image hologram which is employed with a group of filters shown in FIG. 6b.

FIGS. 1a and 1b both show prior-art color-encoded focused image holograms of a red tulip with green leaves in a blue pot. In FIG. 1a, which employs angular encoding, the hologram comprises plane-parallel diffraction gratings 100 R, 100 G, and 100 B, all having substantially the same line frequency. However, grating 100 R, defining the red tulip, grating 100 G, defining the green leaves, and grating 100 B, defining the blue pot, have widely different angular orientations. In the example shown in FIG. 1a, grating 100 R is angularly orientated in a vertical direction; grating 100 G has an angular orientation which is displaced 120° in one direction with respect to the vertical and grating 100 B has an angular orientation which is displaced 120° in the opposite direction with the respect to the vertical.

In the frequency encoded hologram shown in FIG. 1b, the angular orientation of grating 102 R, defining the red tulip, grating 102 G, defining the green leaves, and grating 102 B, defining the blue pot, are all substantially vertical. However, the line frequency of grating 102 B is higher than that of grating 102 G, which, in turn, is higher than that of grating 102 R. More specifically, the respective specified line frequencies of gratings 102 R, 102 G and 102 B are selected to be inversely proportional to the mean spectral wavelengths of the color encoded thereby, as is more fully discussed in the aforesaid U.S. Pat. No. 3,917,378.

Referring to FIG. 2, there is shown a focused image hologram of a red tulip with green leaves in a blue pot which is color encoded in accordance with the principles of the present invention. Specifically, the color encoding of the hologram of FIG. 2 is similar to the angular encoding of FIG. 1a to the extent that grating 200 R, defining the red tulip, grating 200 G, defining the green leaves, and grating 200 B, defining the blue pot have specified angular orientations which are displaced with respect to each other. The focused image hologram in FIG. 2 is similar to that of FIG. 1b to the extent that the line frequency of grating 200 B is larger than that of 200 G, which, in turn, is larger than that of 200 R. However, as shown in FIGS. 2 and 2a, the angular displacement $\theta$ of the respective blue and green gratings 200 B and 200 G relative to the red grating 200 R is much smaller than the angular displacement in FIG. 1a. Further, the ratio of the line frequencies of the gratings 200 B, 200 G, and 200 R with respect to each other is different from the ratio of line frequencies of gratings 102 B, 102 G, and 102 R with respect to each other. The focused image hologram of FIG. 2 is optimumly color encoded for read out by a projector of the type schematically shown in FIGS. 3a and 3b.

The projector shown in FIGS. 3a and 3b illuminates a color-encoded focused image hologram (FIH) 300 located in a given plane with an illuminating beam 302 of white light. Illuminating beam 302 is derived by passing white light from source 304 through condensing optics, such as condensor lens 306. As shown, source 304 occupies a certain location and is of a size that is substantially larger in its horizontal dimension than in its vertical dimension. Illuminating beam 302 is inclined at a read-out angle $\alpha$ with respect to the normal to the given plane occupies by FIH 300. Typically, $\alpha$ is in a range of 10°–40°. Illuminating beam 302 may be plane parallel or somewhat convergent.

Each of the three gratings of FIH 300 diffracts illuminating beam 302 incident thereon into zero and higher diffraction order output light, of which only first diffraction order output light 308 is centered within the aperture of projection optics, such as projection lens 310. Projection lens 310 projects a reconstructed focused image of the hologram 300 on a screen (not shown). Further, condenser lens 306 and projection lens 310 are effective in imaging source 304 onto filter plane 312. Situated in filter plane 312 is a set of spatially separated green, red and blue color filters, 400 G, 400 R and 400 B, shown in FIG. 4.

Each of the three gratings of FIH 300 is effective in dispersing the first diffraction order output light thereof into an entire visible spectrum having spectral portions extending from red to blue. The positions of the three spectra in filter plane 312 are determined by the optics and the spatial line frequencies and the angular orientations of the grating carriers. The carriers are chosen to give green-encoded spectrum 402 g, red-encoding spectrum 402 r and blue-encoded spectrum 402b, the respective portions in the predetermined spatial location in filter plane 312 shown in FIG. 4. Specifically, the red portion r of spectrum 402 r, derived from the red-encoded carrier, is centered on the axis of the projection optics. The green portion g of spectrum 402 g, derived from the green-encoded carrier, is shifted upwards (in accordance with the angular displacement of the green-encoded carrier), such that it does not overlap the red. Further, as indicated in FIG. 4, the spectrum 402 g is angularly inclined with respect to spectrum 402 r. This is due to the angular displacement between the green and red encoded carriers. Preferably, the direction of this angular displacement should be such that the blue ends of the spectra 402 g and 402 r are more proximate than the red ends thereof. This ensures that any overlap whatsoever that possibly may take place between red filter 400 R and spectrum 402 g will be at the blue end of spectrum 402 g, rather than at the red end thereof. Therefore even if there is overlap, no light from the "green" spectrum goes through the red filter.

In a similar manner the spectrum 402 b, derived from the blue-encoded carrier, is shifted downward, as shown in FIG. 4.

Thus, although each of the three spectrums contains all the wavelengths, color decoding is performed by the three color filters 400 G, 400 R and 400 B. The filters are chosen to transmit the appropriate primary wavelength and each occupies about $\frac{1}{3}$ of the total filter plane area.

An advantage of the projector shown in FIGS. 3a and 3b is that the constraints upon source dimensions are considerably relaxed. In the horizontal direction, the source width is limited only by the projection aperture. In the vertical direction the source only must be small enough to ensure non-overlapping spectra. Increasing of the value of the angular displacement (FIG. 2a), improves spectral separation, this increase being limited only by the projection lens aperture. Further hologram illumination may now be either plane parallel or convergent. The stronger the convergence, the closer the filter plane 312 is to the plane of the FIH 300.

Since filter point 312 is that plane in which an image of source 304 is formed, it normally lies beyond projection lens 310. However, with suitable choice of condensing optics, it could also lie before projection lens 310. Further, since the minimum projection lens aperture results when the source is focused inside the lens (as is the case in conventional projection systems), the use is contemplated of a special lens with a filter incorporated internally at an air gap between two lens components to provide a minimum aperture for the projection lens. The main contribution to relaxed source-dimension tolerances comes from the use of convergent illumination in readout.

| No. | Source Vertical × Horizontal | Condenser Focal Length | Source Lens Separation | Carriers Orientation to Vertical | | | Spatial Frequency (lines/mm) | | | Resolution (as limited by beats) |
|---|---|---|---|---|---|---|---|---|---|---|
| | | | | R | G | B | R | G | B | |
| 1 | 2 × 6 mm | 30mm | 30mm | 0° | 12° | −12° | 526 | 660 | 760 | 182 lines/mm |
| 2 | 3 × 10 | 30 | 40 | 0 | 17 | −17 | 526 | 675 | 777 | 230 |
| 3 | 4 × 15 | 30 | 50 | 0 | 20 | −20 | 526 | 687 | 791 | 263 |
| 4 | 3 × 10 | 30 | 30 | 0 | 25 | −25 | 526 | 712 | 820 | 324 |
| 5 | 4 × 12 | 17 | 30 | 0 | 25 | −25 | 526 | 712 | 820 | 324 |

For all systems: Read-out angle = 20°
Hologram size = 14 × 10mm
Projection lens 38 mm f/1.8
Magnification × 15

The above table gives some examples of possible combinations of source, condenser and grating orientations for a readout angle α of 20°.

For comparison, a typical conventional frequency encoded system (with spatial filter encoding) uses a 1×20 mm source collimated by a 30 mm lens for the same projection optics. A considerable gain in allowed source width is realized with the projector of the present invention, particularly for read-out arrangements using convergent illumination, (examples 2-5 of the table). The source dimensions given represent the limiting values with the corresponding condenser. However, a further increase in source dimensions can be obtained at the expense of a reduced light collection efficiency by increasing the condenser focal length. The source positioning is also less critical in a projector of the present invention, in that an incorrectly positioned or oriented source will not affect the colorimetry providing the spectra are not sufficiently shifted to fall on a different filter. Further, resolution in imaging is improved by the removal of the spatial filter slit employed in frequency-encoded FIH color-image projectors. The resolution limiting aperture for each color in the present invention is set by the corresponding filter dimensions. Also, the required carrier orientations represent a favorable combination for reducing the beats between carriers, which limit the resolution at the hologram.

The allowed wider source enables a number of commercially available quartz-halogen lamps to be used in read-out. The condenser collection efficiency may be improved by using a concave mirror behind the source to image the filament back beside itself in the usual manner. Source dimensions, such as those given in the above table are then relevant to the effective overall size of the filament and mirror image. This filament doubling is preferable in horizontal plane (i.e., the source in example 2 in the above table would then be 3×5 mm).

The projector schematically shown in FIG. 5 employs condensing optics comprised of condenser lenses 500 and prism 502 for deriving two separate, symmetrical illuminating beams 504 and 506 from a single white-liquid source 508. In the case of the projector shown in FIG. 5, both illuminating beams 504 and 506 lie in the same plane and are inclined at the same predetermined angle α with respect to the normal to the given plane occupied FIH 300. However, as shown in FIG. 5, illuminating beams 504 and 506 are angularly displaced from the normal in opposite directions.

Thus, in the projector of FIG. 5, FIH 300 is illuminated by two read-out beams, each incident at the same read-out angle α, but with the two beams disposed on opposite sides of the hologram normal. Useful light diffracted normal to the hologram is then composed of the +1 diffractive orders from one read-out beam and the −1 order from the other beam. An increased condenser collection efficiency is achieved this way. The +1 and the −1 spectra filter are not superimposed at the filter plane, but are symmetrically arranged on opposite sides of the axis. The spectra positions and size must, therefore, be changed to ensure non-overlapping spectra.

FIG. 6a shows an arrangement of color filters and spectra which operate with the projector of FIG. 5, when FIH 300 employs the color-encoding as shown in FIGS. 2 and 2a. Specifically, FIG. 6a includes a first set of green, red and blue filters 600 G, 600 R and 600 B, which are intersected by the spatially-separated green, red and blue spectral portions 604 g, 604 r and 604 b of the +1 diffractive order spectrums derived from the respective green-encoded, red-encoded and blue-encoded carriers. In a similar manner, the blue, red and green spectra portions 606 b, 606 r and 606 g of the corresponding −1 diffraction order intersect a second set of color filters 602 B, 602 R and 602 G, as shown in FIG. 6a.

FIG. 6b shows an alternative arrangement of color filters which operate with a focused image hologram that is encoded in the manner shown in FIGS. 7 and 7a. In the focused image hologram 700, the encoding of the red-encoded tulip grating 700 R and the green-encoded leaves grating 700 G is similar to the encoding 200 R and 200 G of the focused image hologram shown in FIG. 2. However, as shown in FIG. 7a, the blue-encoded pot grating 700 B is angularly displaced in the same direction as the green-encoded grating 700 G, with respect to red-encoded grating 700 R, but by substantially twice the angle θ. For a given projector optics, the spectra 610 are positioned as shown in FIG. 6b by suitable choice of carrier frequencies and angle θ.

The projector for FIG. 5 employs the color filter arrangement of FIG. 6b when the focused imaged hologram employs the encoding scheme of FIG. 7. In FIG. 6b, the color filter includes two blue color filters 608 B1 and 608 B2, located at the top and bottom, a single red color filter 608 r, located in the middle, and two green color filters 608 G1 and 608 G2, located between each of the two blue color filters and red color filter. Blue spectral portion 610 B1 and 610 B2 of the +1 and −1 first diffraction order light derived from the blue-encoded carrier intersect blue filters 608 B1 and 608 B2. Similarly, the green spectral portion of 610 G1 and 610 G2 of the +1 and −1 first diffraction order output light derived from the green-encoded carrier intersect green filters 608 G1 and 608 G2. However, the red spectral portion 610 r of both the +1 and −1 diffraction order output light derived from the red-encoded carrier intersect red filter 608 R.

What is claimed is:

1. In a projector for displaying a color picture derived from a focused image hologram situated in a given plane, said hologram being of the type comprising a plurality of plane-parallel diffraction gratings each of said gratings having a different specified angular orientation in said given plane and a different specified constant spatial frequency and being modulated in accordance with a different color component of said color picture to form a spatial carrier for that color component; said projector including first means for illuminating said hologram with an incident non-coherent light beam inclined at a predetermined angle with respect to the normal to said given plane, said non-coherent light beam having a given spectrum which includes a spectral wavelength portion corresponding to each respective one of said color components, and second means responsive only to first diffraction-order output light derived from said respective gratings for projecting said color picture on a viewing screen; the improvement therein:

(a) wherein said first diffraction-order output light derived from each respective one of said gratings is individually dispersed into a separate spectrum of light corresponding to said given spectrum that has an individual spatial location determined by the specified angular orientation and specified spatial frequency of that one grating;

(b) wherein said second means includes a plurality of spatially separated color filters having predetermined spatial locations, at least one of said color filters corresponding in color to each different one of said color components, and (c) said specified angular orientations and specified spatial frequencies of said respective gratings being such that the spatial location of the wavelength spectral position corresponding to any and every certain one of said color components of each of said spectra of light intersects the spatial location of a color filter corresponding in color to said certain one of said color components solely for the spectrum of light which is derived from that one of said gratings which is modulated in accordance with said certain one of said color components.

2. The projector defined in claim 1, wherein said different color components consist of red, green and blue.

3. The projector defined in claim 2,
wherein said first means includes a light source having a spatial location and condensing optics for deriving said non-coherent light beam,
wherein said second means includes projection optics which images said light source in an image plane having a spatial location determined by the spatial location of said light source and said condensing and projection optics, and
wherein said predetermined spatial locations of said color filters are situated substantially in said image plane of said light source.

4. The projector defined in claim 3,
wherein a green color filter is situated adjacent a red color filter, and
wherein a first of said gratings modulated in accordance with said green color component is angularly displaced with respect to a second of said gratings modulated in accordance with said red color component in that direction and by that specified angle that a first spectrum derived from said first of said gratings is inclined relative to a second spectrum derived from said second of said gratings with the blue spectral wavelength portions thereof more proximate to each other than the red wavelength portions thereof, that the green spectral portion of said first spectrum is incident on said green color filter, and that the red spectral portion of said second spectrum is incident on said red color filter.

5. The projector defined in claim 4,
wherein a blue color filter is situated adjacent said red color filter, and
wherein a third of said gratings modulated in accordance with said blue color component is angularly displaced with respect to said second of said gratings in that direction and by that specified angle that a third spectrum derived from said third of said gratings is inclined relative to said second spectrum with the blue spectral wavelength portions thereof more proximate to each other than the red spectral wavelength portions thereof and that the blue spectral portion of said third spectrum is incident on said blue color filter.

6. The projector defined in claim 5,
wherein said second of said gratings has an angular orientation substantially perpendicular to said incident illuminating light beam,
wherein said first of said gratings is angularly displaced in a given direction by a first specified angle with respect to said second grating, and
wherein said third of said gratings is angularly displaced in a direction opposite to said given direction by a second specified angle with respect to said second grating.

7. The projector defined in claim 6, wherein said first and second specified angles are equal.

8. The projector defined in claim 4,
wherein said blue color filter is situated adjacent said green color filter, and
wherein a third of said gratings modulated in accordance with said blue color component is angularly displaced with respect to said first of said gratings in that direction and by that specified angle that a third spectrum derived from said third of gratings is inclined relative to said first spectrum with the blue spectral wavelength portion thereof more proximate to each other than the red spectral wavelength portions thereof, and the blue spectral portion of said third spectrum is incident on said blue color filter.

9. The projector defined in claim 8,
wherein said second of said gratings has an angular orientation substantially perpendicular to said incident illuminating light beam,
wherein said first of said gratings is angularly displaced in a given direction by a first specified angle with respect to said second grating and,
wherein said third of said gratings is angularly displaced in said given direction by a second specified angle with respect to said second grating which is larger than said first specified angle.

10. The projector defined in claim 9, wherein said second specified angle is substantially twice said first specified angle.

11. The projector defined in claim 3,
wherein said condensing means includes means for deriving from said light source a second illuminating non-coherent light beam incident on said hologram at substantially said predetermined angle with respect to the normal to said given plane, said second light beam being disposed in the plane defined by said first-mentioned light beam and said normal to said given plane and being located on the opposite side of said normal from said first-mentioned light beam,
wherein additional spectra are derived from said second light beam, said additional spectra having individual spatial locations respectively determined by the specified angular orientations and specified spatial frequencies of said gratings, and
wherein said plurality of color filters includes an additional color filter in said image plane for each respective additional spectrum.

* * * * *